United States Patent
Krueger

(10) Patent No.: US 8,487,460 B2
(45) Date of Patent: Jul. 16, 2013

(54) WIND ENERGY INSTALLATION WITH INDIVIDUAL PITCH DEVICES

(75) Inventor: Thomas Krueger, Westerroenfeld (DE)

(73) Assignee: REpower Systems SE, Hamburg (DE)

( * ) Notice: Subject to any disclaimer, the term of this patent is extended or adjusted under 35 U.S.C. 154(b) by 1034 days.

(21) Appl. No.: 11/996,563

(22) PCT Filed: Jul. 26, 2006

(86) PCT No.: PCT/EP2006/007410
§ 371 (c)(1),
(2), (4) Date: Jun. 6, 2008

(87) PCT Pub. No.: WO2007/012487
PCT Pub. Date: Feb. 1, 2007

(65) Prior Publication Data
US 2008/0290664 A1    Nov. 27, 2008

(30) Foreign Application Priority Data
Jul. 26, 2005  (DE) .......................... 10 2005 034 899

(51) Int. Cl.
*F03D 9/00*   (2006.01)
*H02P 9/04*   (2006.01)

(52) U.S. Cl.
USPC ........................................................... 290/44

(58) Field of Classification Search
USPC ............... 290/44, 55; 416/1, 132 B, 31, 155, 416/159, 162; 415/1, 2.1, 4.1, 4.2, 4.5, 4.4
See application file for complete search history.

(56) References Cited

U.S. PATENT DOCUMENTS

| | | | | |
|---|---|---|---|---|
| 3,553,472 A | * | 1/1971 | Arlandson et al. | 290/38 R |
| 4,189,648 A | * | 2/1980 | Harner | 290/44 |

FOREIGN PATENT DOCUMENTS

| | | |
|---|---|---|
| DE | 10 2004 005 169 | 11/2005 |
| WO | WO-02/44561 | 6/2002 |
| WO | WO-03/052973 | 6/2003 |
| WO | WO-2005/021962 | 3/2005 |
| WO | WO 2005021962 A1 * | 3/2005 |
| WO | WO-2005/111414 | 11/2005 |
| WO | WO-2006/069573 | 7/2006 |
| WO | WO 2006069573 A1 * | 7/2006 |

OTHER PUBLICATIONS

International Search Report mailed Dec. 8, 2006, directed to counterpart PCT application No. PCT/EP2006/007410.

* cited by examiner

*Primary Examiner* — Julio Gonzalez
(74) *Attorney, Agent, or Firm* — Morrison & Foerster LLP

(57) ABSTRACT

Provided herein is a wind energy installation including a generator for production of electrical energy, a rotor which drives the generator and has variable pitch rotor blades and a central control device, and individual pitch devices provided individually for the rotor blades. The individual pitch devices may include an adjustment drive, a communication link to the central control device and a regulator, the rotor blades being adjustable in order to slow down the wind energy installation to a shut-down position. The individual pitch devices may also include a disturbance situation detector which is designed to identify abnormal operating states and to move the rotor blades to a shut-down position. Also provided herein is the method of operating such a wind energy installation.

29 Claims, 5 Drawing Sheets

WIND ENERGY INSTALLATION WITH INDIVIDUAL PITCH DEVICES

REFERENCE TO RELATED APPLICATIONS

This application is a national stage application under 35 USC 371 of International Application No. PCT/EP2006/007410, filed Jul. 26, 2006, which claims the priority of German Application No. 10 2005 034 899.8, filed Jul. 26, 2005, the contents of both of which prior applications are incorporated herein by reference.

FIELD OF THE INVENTION

The invention relates to a wind energy installation having a generator for production of electrical energy, a rotor which drives the generator and has variable pitch rotor blades and a central control device, with individual pitch devices being provided for the rotor blades, which comprise an adjustment drive, a communication link to the central control device and a regulator, with the rotor blades being moveable in order to slow down the wind energy installation to a shut-down position.

BACKGROUND OF THE INVENTION

Wind energy installations, in particular those in the relatively high rating classes, are increasingly being provided with rotors whose rotor blade pitch angles are adjustable. These are referred to as variable pitch rotor blades. In comparison to those with conventional wind energy installations which dominate the relatively low rating classes and have fixed rotor blades, so-called stall-regulated wind energy installations, they offer the advantage that the mechanical power which is extracted from the wind and is fed into the rotor/generator system of the wind energy installation can be influenced by adjusting the rotor blades. Particularly when the windspeed is high, they offer advantages both in terms of efficiency and in terms of control quality in comparison to stall-regulated installations with fixed rotor blades. A further major advantage of wind energy installations with variable pitch rotor blades is that, in the event of a disturbance, the wind energy installation can be slowed down quickly in an emergency by moving the rotor blades to a zero pitch angle position. In the event of disturbances or in the event of a shut-down for safety reasons, for example because of severe stormy winds, this makes it possible to ensure that the rotor behaves like a flag and no longer exerts any torque on the rotor shaft and the generator.

Various systems have become known for adjusting the rotor blades. On the one hand, so-called central pitch devices exist in which the rotor blades are adjusted jointly, generally hydraulically, by means of an actuator which is arranged in the pod of the wind energy installation or in the hub of the rotor. Central pitch devices such as these have the advantage that their control is simple and their design is generally not very complex. Furthermore, it is known for an individual pitch device to be provided to adjust the pitch angle of each individual rotor blade of the rotor. The individual pitch devices are generally designed to act hydraulically or electrically, and are operated by a higher-level central control device for the wind energy installation. In this case, they can be operated in such a way that the rotor blades are operated jointly (collectively) or such that they are moved individually (cyclically) throughout the revolution of the rotor. In addition to the capability for cyclic adjustment, individual pitch devices also offer the advantage that they allow independent adjustment in an emergency as well, in the event of installation component failure. For example, if one individual pitch device fails, the rotor can still be moved essentially to a zero pitch angle position by the others so that at most only a small torque acts on the generator. Wind energy installations such as these are disclosed in DE-A-197 39 164.

One disadvantage of known wind energy installations with adjustable rotor blades is that the emergency adjustment process can result in high mechanical loads. Rapid movement of the rotor blades while the rotor is still running results in a virtually instantaneous change in the longitudinal thrust, which can result in the substructure disadvantageously starting to oscillate. This can be exacerbated in the case of individual pitch devices if the rotor blades are operated at different rates, thus resulting in the possibility of unbalancing and further loads.

SUMMARY OF THE INVENTION

Against the background of the prior art as cited above, the invention is based on the object of improving a wind energy installation of the type mentioned initially such that it allows safe slowing down during operation, while avoiding dangerous loads in the event of a disturbance.

The solution according to the invention relates to a wind energy installation and to a method having the features of the independent claims. Advantageous developments are the subject matter of the dependent claims.

In the case of a wind energy installation having a generator for production of electrical energy, a rotor which drives the generator and has variable pitch rotor blades and a control device, with individual pitch devices being provided for the rotor blades, which comprise an adjustment drive, a communication link to the central control device and a regulator, with the rotor blades being adjustable in order to slow down the wind energy installation to a shut-down position, the invention provides that the individual pitch devices furthermore comprise a disturbance situation detector which is designed to identify abnormal operating states and is connected to a tripping device which moves the respective rotor blade to a shut-down position.

The invention is based on the idea that the individual pitch devices are designed such that they can identify disturbance situations autonomously and then, in the event of a disturbance, move the rotor blades to the shut-down position, without this being dependent on an appropriate signal from the central control device. The individual pitch devices can also autonomously identify a disturbance situation and can react appropriately, that is to say can move the respective rotor blade associated with them to the safe shut-down position. In this case, the movement of the rotor blades is monitored both in the event of a disturbance and during normal operation so that any discrepancies which may occur from the nominal state can be monitored and compensated for directly. For this purpose, the movement of the rotor blades is individually appropriately matched to the respective conditions which may result in each case from the wind speed, turbulence, incident-flow direction or operating state of the wind energy installation, or of the other individual pitch devices. The invention therefore makes it possible to achieve an optimum rotor blade adjustment behavior, in particular while slowing down, that is to say while the rotor blades are being moved to the shut-down position.

The direct and independent action on the individual rotor blades therefore allows the wind energy installation to be stopped safely even in the event of failure of individual components or in the event of a communication loss. A failure of one or more individual pitch devices can be identified, and can be taken into account when moving the rotor blades to the shut-down position. This allows the wind energy installation to be slowed down safely even when subject to very high loads and in the event of failure of major components, in particular including failure of the pitch adjustment components, thanks to the invention. Furthermore, appropriate feedback between the individual pitch devices and the rotor blades operated by them makes it possible to minimize the load on the rotor blade itself and on the entire wind energy installation.

Compared with unmonitored slowing down according to the prior art, the high loads which occur when slowing down in the conventional manner can be avoided or at least reduced thanks to the individual pitch devices according to the invention which themselves have a certain amount of intelligence for identification and handling of disturbance situations.

The regulator preferably has a selector which is coupled to the disturbance situation detector such that an alternative regulator regime is used dependent on the operating state. In this case, the expression regulator regime means variables which govern the normal and disturbance behavior of the regulator, including preset values and profiles for the reference variables. Different regulator regimes are frequently available for the regulators. The selector makes it possible to select a varied regulator regime as a function of the identified disturbance situation and, possibly, also taking into account the environmental conditions, in particular such as the wind strength, turbulence or incident flow at an angle. This can be achieved by varying the regulator parameters or in the form of different slow-down profiles being fed in, one of which is selected. For example, as one parameter, a gain factor may be varied such that the rotor blades are operated at a first adjustment rate until a critical blade pitch angle is reached, after which the selector changes the gain value such that the process continues at a lower, second adjustment rate. However, alternatively or additionally, it is also possible to provide for the selector to switch to a different slow-down profile. A switching detector is expediently provided, and is designed to determine the operating point at which the regulator regime is changed.

The switching detector allows the rotor blades to be moved to the shut-down position as follows. At the start of the shut-down process, the rotor blades are moved at a high adjustment rate in order to reach the zero pitch angle position as quickly as possible. The switching detector determines a critical blade pitch angle beyond which the aerodynamic conditions adjacent to the rotor are changing such that the longitudinal thrust exerted on the rotor of the wind energy installation by the wind force changes its mathematical sign, that is to say it would create a negative rotor thrust. If the process were to continue without changing the adjustment rate as in the prior art, then the negative longitudinal thrust could lead to the pylon swinging back severely which, if the structural load on the wind energy installation is already high, as a result of weather conditions or component failures, could lead to damage or even to destruction. In order to avoid this, the switching detector determines the critical blade pitch angle, and accordingly varies the regulator parameters such that the adjustment rate is reduced. The rest of the braking process then continues more smoothly with the build up of negative rotor thrust being greatly reduced, and therefore counteracting the risk of damage. The switching detector is designed in such a way that it uses various installation-specific and environmentally specific parameters as input variables, in particular the wind speed, rotation speed and power. This matching to the current conditions allows the load to be reduced significantly in comparison to known systems, in which, in the event of a disturbance, all three rotor blades are slowed down with completely synchronous regulation and at a predetermined, constant blade adjustment rate.

The individual pitch device expediently has a measurement sensor arranged on the rotor. It is therefore able to obtain the necessary measurement signals autonomously and without having to access the central control device and its sensors and/or signal processing. In particular, a rotor blade pitch angle sensor, a rotor position angle sensor, a rotor rotation speed transmitter, a longitudinal acceleration sensor, a lateral acceleration sensor, a rotation acceleration sensor, a centrifugal acceleration sensor, a fire alarm and/or a load sensor can be provided as a measurement sensor or sensors on the root of the rotor blades.

The individual pitch device is expediently provided with an emergency module which results in emergency movement to the shut-down position if other components, in particular the regulator, fail. The individual pitch device can therefore move the rotor blade to its shut-down position autonomously by means of emergency movements, in the event of regulator failure. The emergency movement is expediently not regulated, so that failure of the regulator or of elements of the measurement device has no influence on the emergency movement.

It is advantageous for the individual pitch devices to be connected to one another via a direct communication link within the rotor. This means that the individual pitch devices can communicate with one another even in the event of failure of the central control device and/or of the communication link leading to it. Direct data transmission has the advantage that the individual pitch devices can be synchronized directly with one another and can interchange measurement signals with one another. There is therefore no need for each individual pitch device to have all the measurement sensors, and it may be sufficient to provide one measurement sensor in each case just once for one individual pitch device. The measurement data produced by this sensor can be passed via the direct communication link to other individual pitch devices, for their use. Sensors which are provided more than once can also be checked for plausibility via the link in order to detect sensor failures, without any delay. This therefore allows safety to be improved while also limiting the additional complexity required to do so.

In order to allow safe control of the individual pitch devices in the event of failure of the central control device, at least one individual pitch device is preferably provided with a master module which provides the higher-level control for the other individual pitch devices in the event of failure of the central control device. This not only improves the behavior in the event of failure of the central control device, but also in the event of a possible temporary interruption in the communication link to the central control device. During this time, the master module controls the other individual pitch devices. When the link to the central control device is restored, then it takes over again; if the link is not restored, the master module triggers the tripping device after a certain waiting time. The master module is preferably integrated in the individual pitch device regulator, that can also be in the form of an autonomous unit in the rotor hub. In the latter case, it is expedient for the communication between the individual pitch devices to be passed via the master module. The expression the central control device covers all those components which provide the functionality for higher-level control of the wind energy installation. It may also comprise a plurality of distributed components which are coupled to one another via a data network (for example a bus system).

In order to allow the abovementioned monitoring processes to be carried out expediently, the disturbance situation detector preferably has at least one subsidiary module which is or are designed to monitor the operating state of the other individual pitch devices. In particular, the subsidiary module can be used to identify or transmit signals relating to tripping or failure of one of the other individual pitch devices. If one of the other individual pitch devices has detected an abnormal operating state and has therefore operated the tripping device and is in consequence moving the rotor blade associated with it to the shut-down position, then the other individual pitch devices can each identify this by means of their subsidiary module. They are therefore able to likewise operate their tripping devices, thus resulting in the rotor blades being slowed down synchronously. In order to achieve comparable safety even in the event of failure of an individual pitch device, a corresponding procedure is provided such that, in the event of failure of or a defect in one of the other individual pitch devices, the tripping device is operated. Finally, provision is preferably also made that, in the event of an emergency movement by another individual pitch device, the subsidiary module will cause the other individual pitch devices to operate their tripping device. The selector according to the invention allows the other individual pitch devices to modify their regulators in the event of a failure or a malfunction of one individual pitch device, such that reliable and safe slowing down is ensured despite the failure or the malfunction.

In order to achieve a particularly high level of fail-safety, with respect to possible mechanical damage as well, a wire-free signal link is preferably provided between the individual pitch devices for a tripping/failure state. This has the advantage that no physical signal paths are required, and, instead, communication can take place directly through the air. Damage to cable links or their connectors, for example as a result of an excessive rotation speed or considerable vibration, therefore has no adverse effect on the safety of signal transmission. The wire-free signal link furthermore allows communication in such a way that at least one individual pitch device which has operated the tripping device or has failed, even when both the regular communication links via the central control device and the direct communication link between the individual pitch devices have failed. It is expedient to design the wire-free signal link to be as resistant to interference as possible. It is preferably in the form of a light signal link. The light signal link is expediently designed such that signals are transmitted in a coded form.

This achieves a high degree of interference immunity to influences resulting from environmental light or lightning flashes. Further signals, for example identification of an emergency movement, can also be transmitted by using different codings.

The regulator expediently also has a fine control module which is designed to adjust the rotor blades cyclically so as to minimize the mechanical load. The fine control module means that each individual pitch device is autonomously able to adjust its respective rotor blade cyclically. During normal operation, this is done by data transmission from the central control device. According to the invention, the individual pitch device can continue the cyclic adjustment with its fine control module autonomously even if the communication from the central control device is interrupted. The individual pitch devices can use the direct communication link to determine the cyclic adjustment independently of the central control device and can therefore also vary parameters of the fine control module, such as the amplitude and phase angle of the cyclic adjustment. The advantages resulting from cyclic blade adjustment are therefore retained. This is still true even when, while the installation is being stopped, the rotor blades are moved collectively in the direction of the shut-down position; the fine control module can also be used to carry out the cyclic adjustments, which are advantageous for installation loading, during superimposed operation. The fine control module is preferably provided with a local rotor position angle sensor, associated with the individual pitch device, in order to achieve a high degree of redundancy. The fine control module is expediently developed such that, when a failure of one of the individual pitch devices is identified, the others modify the cyclic adjustment such that the loads on the wind energy installation, in particular on the rotor and the pylon, are minimized. The fine control module means that the cyclic blade adjustment is robust in the event of failure of individual pitch devices. Particularly in a situation in which one individual pitch device has failed and the loads are asymmetric because of this, it is particularly valuable for the cyclic adjustment functionality of the remaining individual pitch devices to counteract the increase in load.

The invention also relates to a wind energy installation having a generator for production of electrical energy, a rotor which drives the generator and has variable pitch rotor blades and a central control device, with individual pitch devices being provided for the rotor blades and comprising an adjustment drive, with the rotor blades being adjustable in order to slow down the wind energy installation to a shut-down position, and with the individual pitch devices being part of a hub monitoring system which is fixed to the rotor and comprises a measurement sensor and a communication link to the central control device, in which case the invention provides for the hub monitoring system which is fixed to the rotor to also have a disturbance situation detector which is designed to identify abnormal operating states, and is connected to a tripping device which adjusts the rotor blades to a shut-down position. This variant differs from that explained above essentially in that, during normal operation, the functions of the rotor are not monitored locally by the individual pitch devices but centrally, either by the central controller or by a central hub monitoring system. According to this variant of the invention, the hub monitoring system has the disturbance situation detector. The disturbance situation is identified by the hub monitoring system, and the individual pitch devices are operated as necessary. There is no need for the individual pitch devices to have their own regulators, and they may be omitted. In addition, disturbance situation detectors may be provided on the individual pitch devices, although this is not necessary. This variant of the invention is distinguished in that it provides a monitoring functionality in the hub with the disturbance situation detector, which monitoring functionality is independent of the central control device and of the communication link to it. Slowing down is therefore also ensured when the central control device and/or the communication link to it are/is faulty. The complexity required for this is minimal and, in the simplest case, it is sufficient for the hub monitoring system to have a common disturbance situation detector for the individual pitch devices. The hub monitoring system may be restricted to one core task, specifically to monitor disturbance situations. This allows the hub monitoring system to be of simple design, with corresponding advantages for operational safety. This variant of the invention is therefore particularly suitable as a final safety facility, in order to ensure that the wind energy installation will invariably be slowed down in a controlled manner.

It is self-evident that, in this variant, measurement sensors are expediently provided for the hub monitoring system, such as a rotor rotation speed transmitter, a rotor position sensor, a longitudinal acceleration sensor, a lateral acceleration sensor, a rotation acceleration sensor, a centrifugal acceleration sensor and/or a fire alarm, on the rotor. In consequence, the hub monitoring system is largely autonomous and independent of the central control device. In one expedient development, the hub monitoring system also has a master module. This means that the actual "intelligence" for control of the operation of the rotor is arranged autonomously in the hub. In this situation, the central control device then just needs to carry out higher-level tasks and is informed about the respective installation state by means of status signals from the hub monitoring system. It should be noted that the hub monitoring system can also additionally be provided in order to ensure further operation in the event of failure of the corresponding function in the central control device.

The invention also relates to a corresponding method for operation of a wind energy installation having the features of the independent method claim. Advantageous developments of the method are the subject matter of the claims which are dependent on it.

With regard to further explanation of the method and of the components used in this case, reference is made to the above statements.

BRIEF DESCRIPTION OF THE DRAWINGS

The invention will be explained in the following text with reference to the drawing, which illustrates advantageous exemplary embodiments. In the figures.

DETAILED DESCRIPTION OF THE INVENTION

Figure 2:
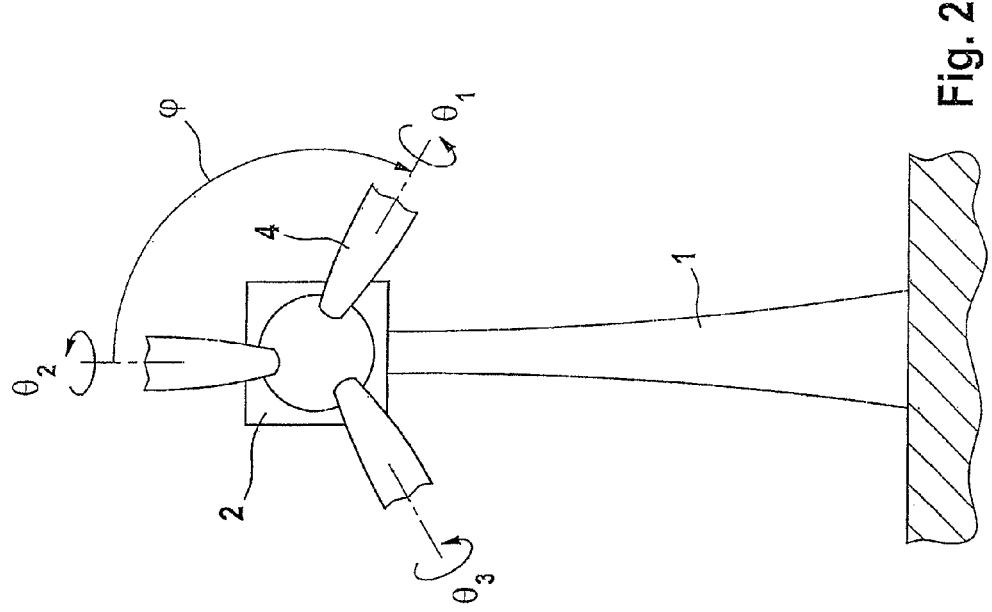
FIG. 2 shows a front view, illustrating the pitch angle of the rotor blades and the rotor position.
Figure 1:
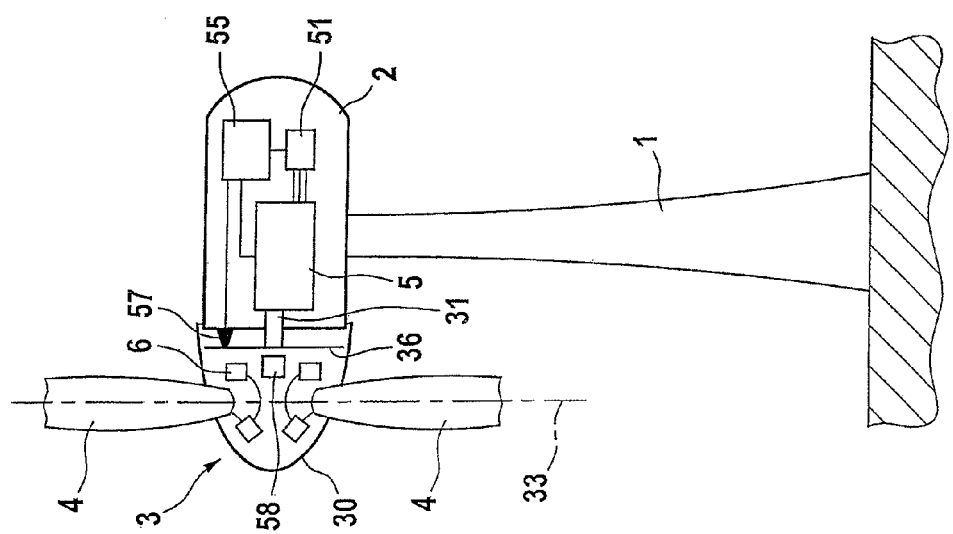
FIG. 1 shows a schematic overall view of a wind energy installation according to the invention.
Figure 3:
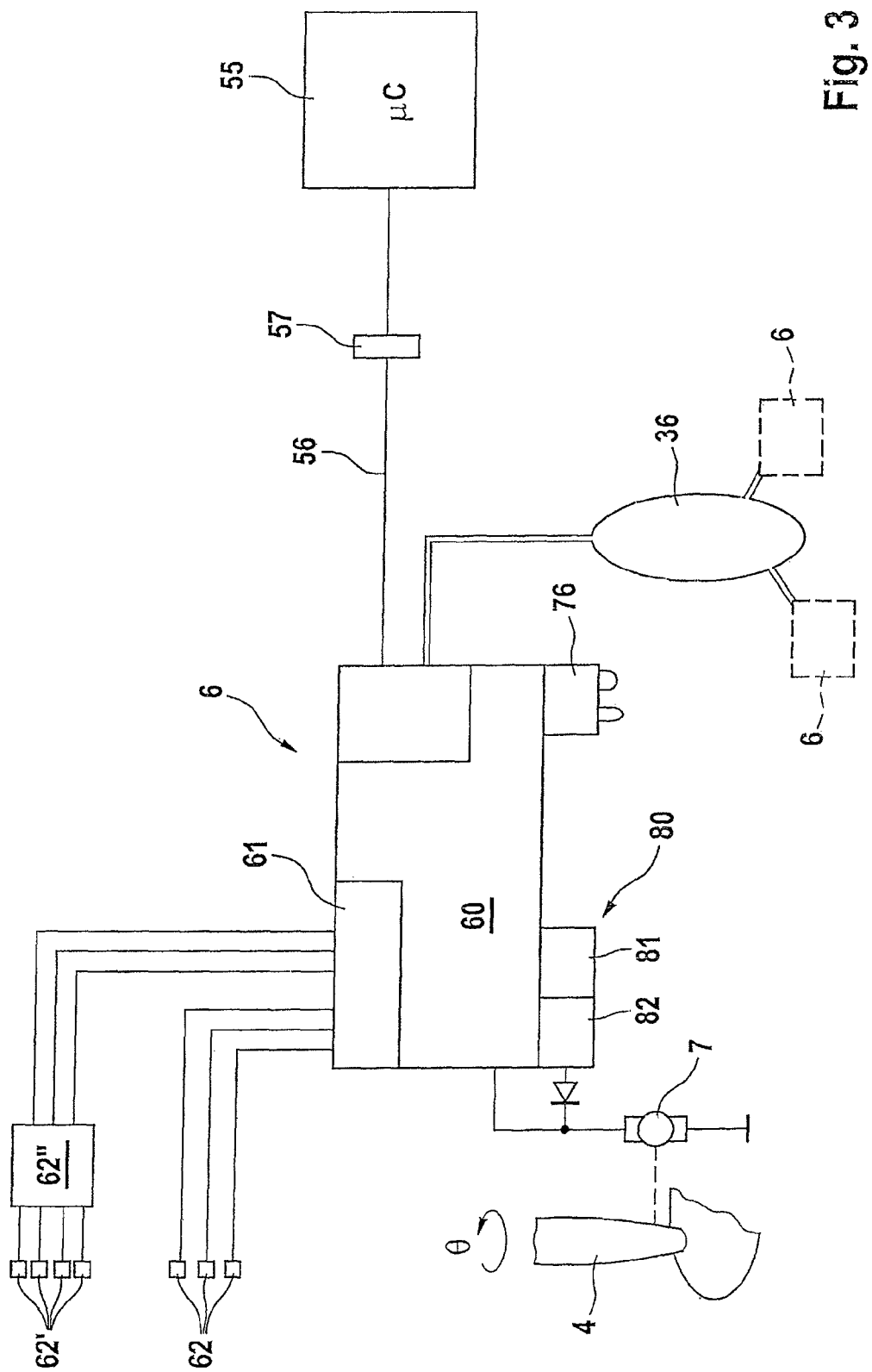
FIG. 3 shows a schematic overall view of an individual pitch device according to the invention.
Figure 4:
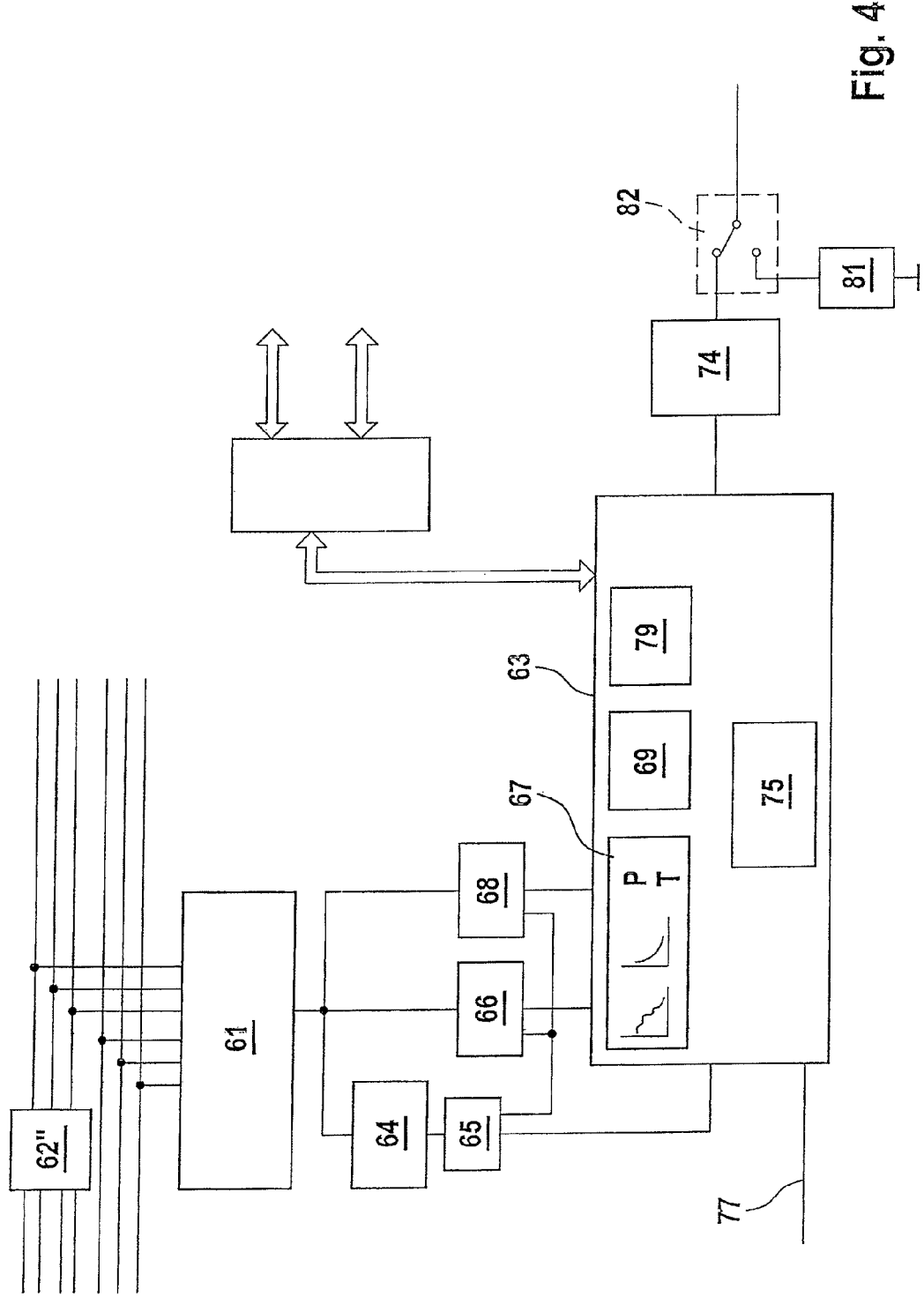
FIG. 4 shows a schematic block diagram of the regulator for the individual pitch device illustrated in FIG. 3.
Figure 5:
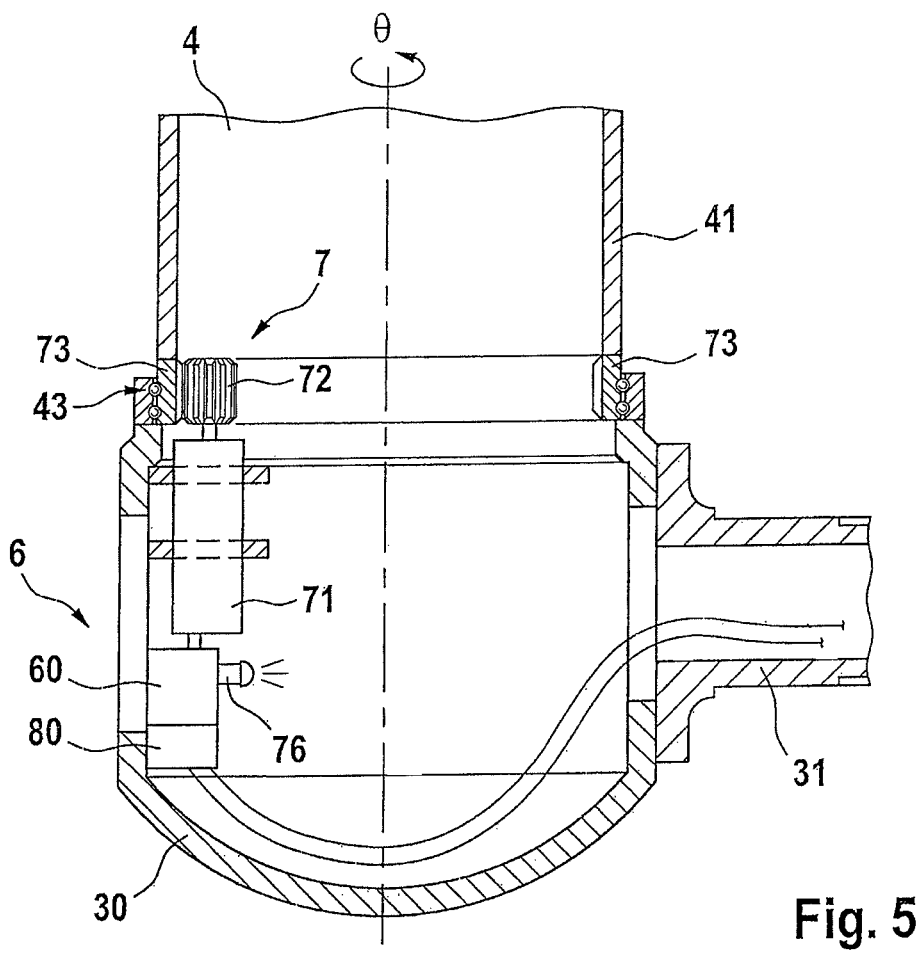
FIG. 5 shows a detail enlargement of a part of a rotor in the area of the blade root holder.

The exemplary embodiment illustrated in FIG. 1 for a wind energy installation according to the invention comprises a pylon 1 as the substructure. A pod 2 is arranged at its upper end such that it can pivot on a horizontal plane (azimuth plane). A wind tracking device (not illustrated) is provided for azimuth adjustment. A rotor 3 with a hub 30 is arranged on one end face of the pod, via a rotor shaft 31 such that it can rotate on the pod. A generator 5 is arranged in the pod 2 and is driven via the rotor shaft 31. The generator 5 converts the mechanical energy supplied via the rotor shaft 31 to electrical energy, which is made available via a converter 51 and via transmission connectors, which are not illustrated, for the feeding into an electrical grid system. A central control device 55 is provided in order to control the wind energy installation and to control its operation as a function of externally predeterminable criteria. To this extent, this corresponds to the basic design of a wind energy installation, as known per se.

The rotor 3 has a plurality of rotor blades 4 (generally three of them distributed uniformly over the circumference), which are arranged at a variable angle on a rotor hub 30. In this case, variable angle refers to the angle of the rotor blade 4 with respect to the rotation plane 33 of the rotor. Since the rotor blades 4 are normally twisted, a main profile chord is defined for definition of the pitch angle, with its angle with respect to the rotor rotation plane 33 being the governing factor. The rotor blade 4 is attached to the rotor hub 30 at its blade root 41 by means of a ball bearing 43 such that it can rotate about its longitudinal axis. An individual pitch device 6 is arranged on each rotor blade 4 in order to adjust the pitch angle, which is referred to in the following text as θ.

The individual pitch device 6 comprises a regulator 60 and an adjustment drive 7. The adjustment drive 7 comprises a variable rotation speed electric motor 71 which acts via a gearwheel transmission 72 on a toothed ring 73, which is arranged such that it cannot rotate on the outer circumference of the blade root 41 of the rotor blade 4. The forces or torques required to pivot the rotor blade 4 are introduced via the transmission 72 and the toothed ring 73. When the electric motor 71 moves, then the rotor blade 4 rotates to a lesser or greater pitch angle θ dependent on the rotation direction of the electric motor 71. The individual pitch device 6 also has an emergency module 80, which has a power supply device 81 and a switching and controlling block 82. This is designed to move the rotor blade 4 to a safe shut-down position, by means of the energy stored in the energy storage device 81, in the event of a failure of the regulator 60 or a failure of the regular power supply. The safe shut-down position is the zero pitch angle position. This is defined by the angular position at which the rotor blade 4 offers the least resistance to the wind flowing parallel to the rotor shaft 34. For control purposes, in this shut-down position, the rotor blade 4 does not transmit any torque to the rotor shaft 31, although this is not absolutely essentially the case. The adjustment drive and/or the emergency module do not necessarily need to be electrical, but can also be hydraulic.

The design of the individual pitch device 6 will now be explained in more detail. The regulator 60 is located in the center and is connected via a communication link 56 to the central control device 55. The communication link 56 passes via a rotary transformer 57 which is arranged at the junction between the rotor hub 30 and the pod 2. A further communication link is also connected, to be precise a direct communication link 36, which is arranged within the rotor hub 30 and links the individual pitch devices 6 which are associated with the individual rotor blades 4 to one another. This is preferably a conventional cable link, for example a high-speed serial bus, which links the individual pitch devices directly, in the form of a ring for redundancy reasons. Finally, a transmitting/receiving unit for a light signal link 76 is also arranged on the regulator 60. This is designed to provide communication independently of wire-based transmission paths with the other individual pitch devices 6 in the rotor hub 30.

The individual pitch device 6 also has a measurement device 61 to which a plurality of measurement sensors are connected for various parameters, which are referred to in their totality by the reference symbol 62. It is also possible to provide for data detected by measurement sensors 62' to be processed by means of signal processing 62''; in particular, this can be done in order to determine variables which cannot be measured directly, from other measurable variables. Parameters are, for example, the rotation speed of the rotor 3, the pitch angle of the rotor blade 4 which is operated by the respective individual pitch device 6, the pitch angles of the other rotor blades 4, the rotor position angle φ of the rotor 3, the mechanical load on the rotor blade 4, the longitudinal and lateral acceleration of the rotor hub 30, measurement and estimated values for the wind speed and direction, as well as values for the electrical power that is produced. Finally, a vibration transmitter can also be provided in order to determine any unbalance of the rotor 3.

The regulator 60 has a regulator core 63 which is designed to use control algorithms that are known per se to adjust the pitch angle θ of the associated rotor blade 4 in accordance with the requirements from the central control device 55. The regulator core 62 has a reference connection 77, to which reference variable signals are applied from the central control device 55. This uses the input variables supplied from the measurement device 61 as well as signals supplied via the communication link 56, in particular the reference variable signals, to the central control device 55, and possibly further signals via the direct communication link 36 to produce drive signals for the adjustment drive 7. The drive signals may be a collective blade pitch angle, a cyclic blade pitch angle with phase information, as well as slow-down profiles. The slow-down profiles may be determined as a precaution continuously as a function of the environmental conditions and operating conditions, by the central control device 55, and may be transmitted to the individual pitch devices 6. The adjustment drive 7, as explained above, rotates the rotor blade 4 about its longitudinal axis in order to vary the pitch angle θ.

The regulator 60 also has a disturbance situation detector 64. This is designed to use the parameters measured by the measurement device 61 and/or determined parameters to identify whether and when an abnormal operating state of the wind energy installation has occurred or is occurring. The parameters evaluated by the disturbance situation detector 64 include in particular the pitch angle θ of the rotor blade 4 which is operated by the respective individual pitch device 6, the pitch angles θ of the other rotor blades 4, the rotor position angle φ of the rotor blade 4 with respect to the rotary movement about the rotor axis, the mechanical load on the rotor blade 4, in particular in the form of the bending torque acting on the blade root 41 and/or the acceleration of the rotor hub 30 in the direction of the axis of the rotor shaft 31. The disturbance situation detector 64 is designed to use preselectable algorithms to identify when an abnormal operating state has occurred or is occurring. The disturbance situation detector 64 is expediently also connected via the communication link 56 to the central control device 55. It may be designed to monitor the communication link 56 to the central control device and/or the direct communication link 36 to the other individual pitch devices 4.

One output of the disturbance situation detector 64 is connected to a tripping device 65, which is operated when the disturbance situation detector 64 detects a discrepancy from the nominal state. The tripping device 65 causes the regulator 60 to leave the normal program and to carry out a slow-down program with the aim of moving the rotor blade 4 to the shut-down position. A special regulator regime 67 is provided for this purpose. The regulator regime 67 is formed from parameters of the regulator core 63 and slow-down programs, which describe the adjustment of the pitch angle θ in order to reach the shut-down position. If there are a plurality of slow-down programs, then a selector 68 can be used to select an appropriate slow-down profile, depending on the discrepancy identified by the disturbance situation detector 64.

More than one slow-down profile may be used for the entire adjustment process to reach the shut-down position. Frequently, the situation is also that either a slow-down profile is modified, or a change is made to a different slow-down profile. A switching detector 66 is provided for this purpose, and is designed to determine when it will be expedient to switch to a different slow-down profile or when a regulator parameter should be changed. In order to avoid the individual pitch devices 6 switching at different times and thus producing additional rotor asymmetries, it is advantageous to synchronize the switching points of the three individual pitch devices 6. The switching detectors 66 of the respective individual pitch devices 6 are expediently coupled for this purpose such that all of the individual pitch devices 6 are switched on identification of the critical blade angle being exceeded for the first time (or not until the latest case). Switching is particularly advantageous once two rotor blades have exceeded the critical blade angle.

The regulator 60 also has a variator 69, which is designed to vary the regulator parameters. In the event of a disturbance, it can therefore deliberately vary control parameters, such as coefficients P or time constants, as a function of the operating state. This makes it possible to carry out dynamic changes while the slow-down program is running. The slow-down program therefore does not produce a schematic slow-down process and changes may be made as required, based on the measured operating state. This will be explained using the example of the rotation speed of the rotor 3. This is detected continuously by the measurement device 61. The switching detector 66 determines whether the braking process of the rotor 3 produced by the adjustment of the rotor blades 4 is being carried out as planned. If this is not the case, but, for example, the rotor rotation speed is even rising because of the wind becoming stronger, the regulator regime is modified. This can be done in such a way that the variator 69 increases a coefficient provided for a proportional element of the regulator core 63 such that a drive signal for the adjustment drive 7 is likewise increased, and movement takes place at a greater adjustment rate than that originally intended. This modification allows flexible reaction even to system failures which occur during the slowing-down process. In particular, this makes it possible to compensate for a failure of one of the individual pitch devices 4, by the other individual pitch devices 4 selecting an appropriately higher adjustment rate.

The selector 68 and/or the variator 69 can advantageously be used additionally for protection of the wind energy installation against structural overloading. If, for example, a measurement device is provided for the rotor blade load at the rotor blade root 41, then it is also possible to use this signal. If this exceeds a specific threshold, then the adjustment rate is appropriately reduced in order to avoid overloading the rotor. Furthermore, a measurement such as this can advantageously be used for the switching detector 66. In order to determine the critical blade pitch angle in order to avoid negative rotor thrust, for example, it is possible to make use of the sensor for the rotor blade load since, on reaching the critical blade pitch angle, the aerodynamic rotor blade load assumes the value zero. In the event of an individual pitch system failure, the resultant asymmetry cannot be compensated for completely. However, switching takes place to a shut-down profile which allows the best possible compromise between asymmetry and braking effect. If required, additional control signals can also be emitted, for example, to a disk brake (not illustrated) for the rotor shaft 31.

The individual pitch devices 6 of the rotor blades 4 are directly connected to one another within the rotor hub 30 by means of the direct communication link 36. The direct communication link 36 has the advantage that, unlike the communication link 56 to the central control device 55, it does not need to be passed via a rotary transformer 57. Reliability problems, in particular those resulting from wear, therefore do not occur. The individual pitch device 6 can pass a signal to the other individual pitch devices 6 because of the direct communication link 36 when its disturbance situation detector 64 operates the tripping device 65. Synchronous reaction of the individual pitch devices 6 can therefore be ensured even in those situations when a slow down is not initiated centrally by the central control device 55. Furthermore, this allows the individual pitch devices 6 to monitor one another. This makes it possible to implement enhanced safety functionalities for each individual pitch device, for example to identify the failure of another individual pitch device 6. A failure, in particular a total failure, of one of the other individual pitch devices 6 can thus be identified and—if possible—can be signaled via the communication link 56 to the central control device 55. If, for example, the regulator for one individual pitch device 6 fails, such that the disturbance situation detector 64 uses the tripping device 65 to initiate an uncontrolled slow down of this individual pitch device 6, one advantageous strategy to avoid asymmetries is to use the actual pitch value of this individual pitch device as a nominal value for the two other individual pitch devices (possibly with an offset in order to compensate for the time delay). If necessary, this synchronous adjustment also has a cyclic adjustment superimposed on it by means of a fine control module (see the following paragraph). Furthermore, measurement signals may be interchanged via the direct communication link 36. This makes it possible to make the measured values from the individual measurement sensors 62 of one of the individual pitch devices 6 available to the other individual pitch devices 6.

Finally, a fine control module 74 is also provided, and is designed to adjust the rotor blades 4 cyclically and individually throughout the revolution of the rotor. This cyclic adjustment is superimposed on the collective adjustment of the rotor blades 4. The cyclic blade adjustment makes it possible to compensate for asymmetries such as those which can occur in particular as a result of different incident-flow conditions over the rotor area. Conditions such as these can occur as a result of a different wind strength, direction or flow conditions over the area covered by the rotor 3. Furthermore, further differences can occur in the upstream or downstream area of adjacent wind energy installations. In conditions with different incident-flow relationships, cyclic blade adjustment also makes it possible to reduce the additional loads on the wind energy installation resulting from this. In particular, this allows a better response to oblique incident flows (vertical and/or horizontal) since pitch or yaw torques caused by asymmetry can be reduced by means of the cyclic adjustment carried out by the fine control module. This also applies to those asymmetric states caused by failures of components. If one of the individual pitch devices 6 fails, then the asymmetry resulting from this, and therefore the additional high load on the wind energy installation, can be reduced by superimposed cyclic adjustment of the remaining individual pitch devices 6. A corresponding situation applies in the event of a failure of the wind tracking device (not illustrated).

During normal operation, the operation of the individual pitch devices is controlled by the central control device 55. They receive control and reference signals, in particular for the pitch angle to be set collectively for all the rotor blades, cyclic blade pitch angles together with phase information for additional individual adjustment of the rotor blade, and, as a precaution, slow-down profiles which are calculated to be advantageous for the respective environmental conditions and operating conditions.

If only one disturbance situation occurs, irrespective of whether this is a failure of the central control device 55 or parts of it, a failure of the communication links 36, 56, a failure of the grid system or of the generator, abnormal parameters in particular such as overspeeding of the rotor 3 or severe acceleration of the rotor 3, then this can be identified by the disturbance situation detector 64. If, for example, a failure of the communication link 56 is assumed as a result of a defect in the rotary transformer 57, the disturbance would be identified during normal operation by the central control device 55, and appropriate signals would be transmitted to the individual pitch devices 6. However, signal transmission is no longer possible because of the failure of the communication link 56. According to the invention, the individual pitch devices 6 have the capability to autonomously identify the disturbance situation, to be precise by means of the disturbance situation detector 64. On identification, the disturbance situation detector 64 initiates the tripping device 65. In general, this means that the wind energy installation will be slowed down, that is to say the rotor blades 4 are moved to the shut-down position. In contrast to a normal slowing-down process, the rotor blades are moved quickly in the case of an emergency shut-down in the event of a disturbance, in order to reach the safe shut-down state quickly.

Figure 6:
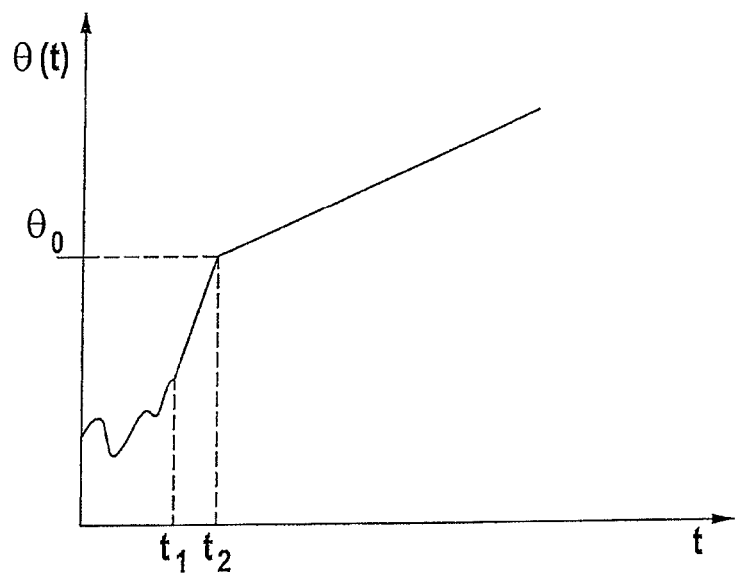
FIG. 6 shows a diagram illustrating the adjustment of the blade pitch angle in the event of a disturbance.
Figure 7:
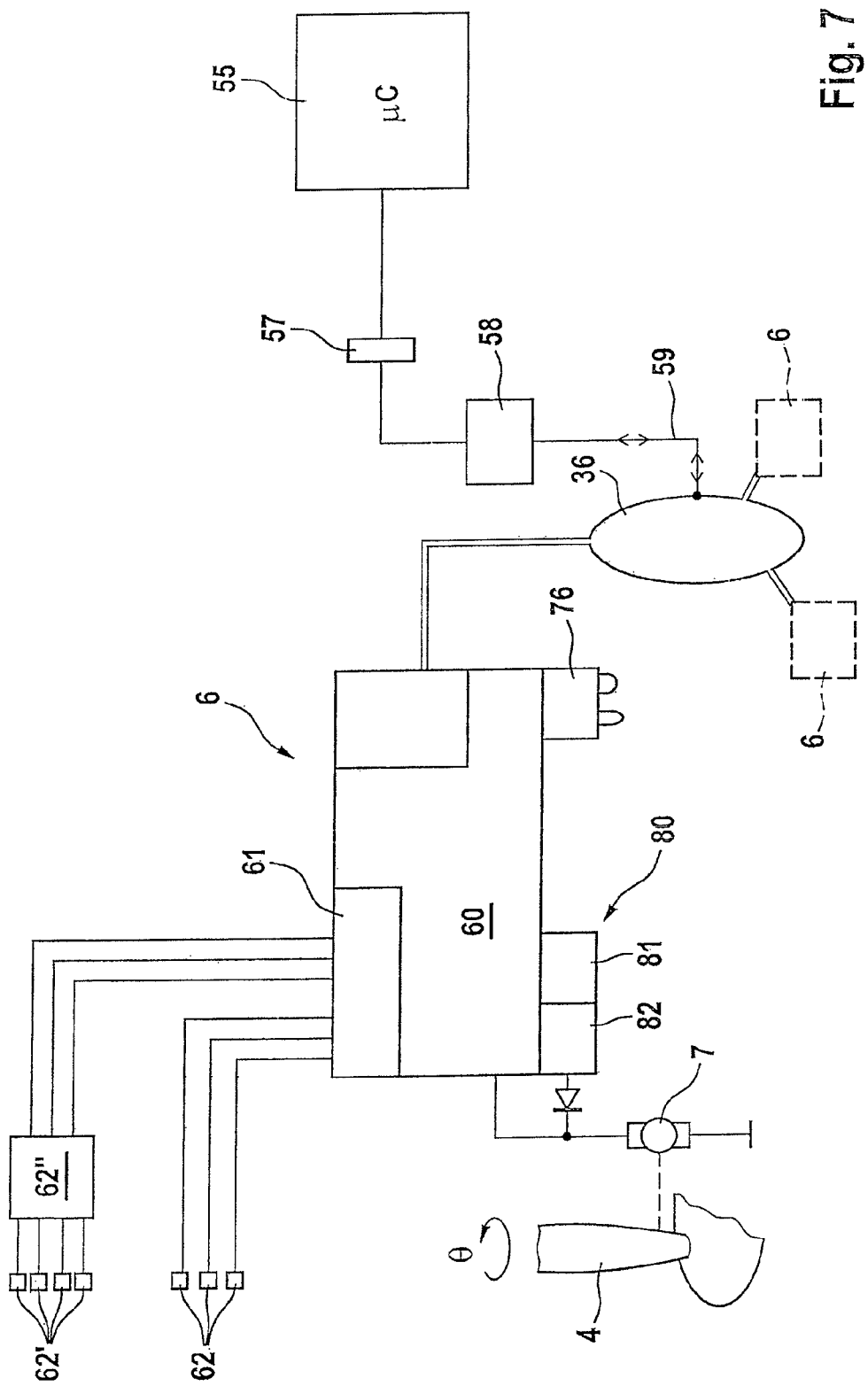
FIG. 7 shows a view similar to FIG. 3 of a variant of the invention according to a second exemplary embodiment.

Let us assume that the disturbance situation detector 64 has identified that a disturbance has occurred in the form of an interruption in the communication link 56. It operates the tripping device, which in turn causes the regulator 60 to change to a regulator regime for slowing down, with the slowing-down process being carried out cautiously, however, without any safety risk. The way in which this is done will be explained in the following text, to be precise using the example of avoidance of negative rotor thrust. If the rotor blade 4 is moved quickly while being slowed down, then, depending on the respective operating state and the environmental conditions, it is possible to reverse the direction of the longitudinal thrust exerted by the wind forces on the rotor shaft 31. This is referred to as negative rotor thrust. The occurrence of negative rotor thrust is undesirable since it represents a load change for the wind energy installation, and, in particular if the pylon 1 is soft, this can lead to it swinging back, which quite often leads to structural damage. Conventionally, there is a risk that, if the rotor blade 4 is adjusted quickly, the rotor thrust will become negative beyond a critical blade pitch angle. This risk can admittedly be overcome by a slower rate of adjustment, but this would have the disadvantage that the rotor blades 4 would not reach their shut-down position until later, with the rotor 3 being braked more slowly; however, this can lead to overspeeding and therefore to safety problems. FIG. 6 shows the time profile of the pitch angle θ. At the time $t_1$, the disturbance situation detector 64 identifies a disturbance, and operates the tripping device 65. At the start of the slowing-down process, the selector 68 selects a regulator regime 67 which provides a high adjustment rate. If the switching detector 66 identifies that the critical blade pitch angle $θ_0$ has occurred at the time $t_2$ because of the operating conditions and environmental conditions, beyond which there is a threat of negative rotor thrust, then it changes the regulator regime 67 by means of the selector 68 or the regulator parameters so as to set a low adjustment rate. This prevents the occurrence of negative rotor thrust, and the rest of the braking process then takes place more smoothly, with less load on the wind energy installation. Cyclic blade adjustment, which may be provided, together with its positive characteristics on the stability of the system can be maintained during this process. Particularly in the case of a strong oblique incident flow, such as that which can occur in the event of wind gusts from different directions or in the event of failure of the wind tracking device, cyclic blade adjustment makes it possible to reduce the occurrence of high pitch and yaw moments. This is a major advantage especially during an emergency slow down, since, because of the abnormal operating state of the wind energy installation, it is no longer possible to absolutely ensure that the pod 2 will be rotated precisely in the wind direction.

During the slowing-down process, a plurality of variables are, of course, monitored, rather than just one variable, such as the rotor thrust. Monitoring of the rotation speed of the rotor 3 is particularly important. If this rises in an unplanned manner, for example because of the wind becoming stronger, then the regulator regime is changed again by means of the selector 68 and variator 69. As already explained, this can be done by changing the slowing-down profile and/or by changing regulator parameters.

If the disturbance situation detector 64 of the individual pitch device 6 identifies that another individual pitch device has failed, then the tripping device 65 is operated. Since it can in general be expected that higher loads will occur because of asymmetry when one of the individual pitch devices 6 fails, the selector 68 is used to select a different slowing-down profile, which is suitable for this purpose. It is therefore also possible in this situation to reduce the loads that occur. It is self-evident that the slowing-down profile is not used strictly schematically, but the parameters and slowing-down profiles can be changed, thanks to the switching detector 66, by means of the selector 68 and the variator 69. A corresponding situation applies when one of the individual pitch devices 6 has initiated the emergency module 80, and an emergency movement is being carried out. The adjustment process can no longer be influenced during emergency operation. Those individual pitch devices 6 which are still operating select and/or modify their regulator regime such that the loads on the wind energy installation remain as low as possible.

The disturbance situation detector 64 may also be part of a hub monitoring system 58. This carries out the monitoring function and if required initiates a slow down, to be precise independently of the central control device 55. During normal operation, control signals are transmitted from the central control device 55 to the hub monitoring system 58 in the described manner via the rotary transformer 57 and the signal line 56. The disturbance situation detector associated with the hub monitoring system 58 was designed in a corresponding manner to the disturbance situation detector 64, as described above. However, it now operates as a central identification unit which actually and only carries out the monitoring with respect to disturbance situations. When a disturbance situation is identified, then appropriate signals for slowing down are applied to the individual pitch devices. The hub monitoring system 58 may be provided with its own sensor system fixed to the rotor, or else it may access the measurement sensors 62, 62' of the individual pitch devices 6 via the hub control line 59 and the direct communication link 36. In both cases, this allows autonomous operation of the hub monitoring system 58, to a certain extent. Optionally, it is also possible to provide for the hub monitoring system 58 to have a master module. This allows a high degree of independence of the hub monitoring system 58 from the central control device to be achieved not only with respect to the monitoring function but also with respect to normal operation. In particular, this has the advantage that disturbances in the link, such as those which can occur as a result of the rotary transformer 57, in particular have no negative influence on the operation of the hub monitoring system 58 overall and on the operation of the individual pitch devices 6. It is self-evident that, if the hub monitoring system 58 fails, the individual pitch devices 6 can operate autonomously in the same manner as that described above in conjunction with the failure of the central control device 55.

The light link 76 is provided in order to make the critical communication within the hub of the rotor 3 safer. This is used to indicate the confirmation of the tripping device 65 of an individual pitch device 6 or the slowing down in the emergency mode, by means of flash codes. For this purpose, the light signal link 76 has a light emitter as well as a photodetector. The flash codes are chosen such that they can reliably be distinguished from fluctuations in the natural environmental light or from lightning. This therefore ensures that the shut-down is signaled to all the individual pitch devices 6 even in the event of a complete communication failure both of the communication link to the central control device 56 and of the direct communication link, for example as a result of damage to the rotor hub 30 by a foreign body.

Finally, the individual pitch device 6 may have a monitoring module 79. This is designed to autonomously monitor the individual pitch device 6 and, for this purpose, to transmit signals relating to the operating state and those of the measurement device 61 to the central control device 55. This is particularly expedient when the individual pitch devices 6 receive control and reference signals from the central control device 55 during normal operation. In this case, the central control device 55 must receive a signal when the tripping device 65 is operated. This makes it possible to prevent the autonomous blade adjustment by the master module being overdriven by signals from the central control device 55. In addition, the measurement device 61 may have a statistics module (not illustrated). This makes it possible to gather measurement data over a relatively long time period, and to subject this data to statistical analysis. This allows continuous or even predictive monitoring. This expands the capabilities for fault identification, and in particular allows faults to be identified better in good time.

While various embodiments of the present invention have been described above, it should be understood that they have been presented by way of example only, and not as limitations. It will be understood by those skilled in the art that various changes in form and details may be made therein without departing from the spirit and scope of the invention. Thus, the breadth and scope of the present invention should not be limited by any of the above-described exemplary embodiments, but should be defined only in accordance with the following claims and their equivalents.

The invention claimed is:

1. A wind energy installation, comprising:
   a generator for production of electrical energy;
   a rotor which drives the generator and has variable pitch rotor blades;
   a central control device for controlling the wind energy installation; and
   individual pitch devices provided individually for the rotor blades, the individual pitch devices comprising an adjustment drive, a communication link to the central control device and a regulator, the individual pitch devices being configured to adjust the rotor blades to slow down the wind energy installation to a shut-down position,
   wherein the individual pitch devices further comprise their own disturbance situation detector and their own tripping device, the disturbance situation detector being configured to identify abnormal operating states autonomously of the central control device and being connected to the tripping device configured to move the respective rotor blade to a shut-down position.

2. The wind energy installation of claim 1, wherein the regulator has a selector which is coupled to the disturbance situation detector such that the selector selects a regulator regime depending on an operating state.

3. The wind energy installation of claim 2, wherein the regulator has a switching detector which is configured to determine a switching point for a regulator regime.

4. The wind energy installation of claim 2 or 3, wherein the regulator regime comprises parameters for the regulator.

5. The wind energy installation as claimed in claim 4, wherein the regulator regime comprises slow-down profiles.

6. The wind energy installation of claim 2 or 3, wherein the selector or the switching detector is configured such that the rotor blades are operated at a first adjustment rate until a critical blade pitch angle is reached, and are then operated at a lower, second adjustment rate.

7. The wind energy installation of claim 1, wherein the individual pitch devices comprise measurement sensors, which are arranged on the rotor, for a measurement device.

8. The wind energy installation of claim 7, wherein a rotor blade pitch angle sensor, a rotor rotation speed transmitter, a rotor position sensor, a longitudinal acceleration sensor, a lateral acceleration sensor, a rotation acceleration sensor, a centrifugal acceleration sensor, a fire alarm or a load sensor is provided as a measurement sensor.

9. The wind energy installation of claim 1, wherein at least one of the individual pitch devices is provided with an emergency module which results in emergency movement to the shut-down position if other component fails.

10. The wind energy installation of claim 1, wherein the individual pitch devices are connected to one another via a direct communication link within the rotor.

11. The wind energy installation of claim 1, wherein at least one of the individual pitch devices has a master module which acts as a hub control module for other individual pitch devices if the central control device fails.

12. The wind energy installation of claim 1, wherein the disturbance situation detector has at least one subsidiary module which is configured to identify tripping, failing or emergency movement by one of the other individual pitch devices.

13. The wind energy installation of claim 1, wherein a wire-free signal link is provided between the individual pitch devices for a tripping or failure state.

14. The wind energy installation of claim 1, wherein the regulator has a fine control module, which is configured to adjust the rotor blades cyclically.

15. The wind energy installation of claim 14, wherein the fine control module is configured to carry out the cyclic adjustment independently of the other individual pitch devices.

16. The wind energy installation of claim 14 or 15, wherein the fine control module is provided with a local rotor position sensor associated with the individual pitch device.

17. A wind energy installation, comprising:
a generator for production of electrical energy;
a rotor which drives the generator and has variable pitch rotor blades;
a central control device for controlling the wind energy installation; and
individual pitch devices provided individually for the rotor blades and comprising an adjustment drive, with the rotor blades being adjustable in order to slow down the wind energy installation to a shut-down position,
the individual pitch devices being part of a hub monitoring system which is fixed to the rotor and comprises a measurement sensor and a communication link to the central control device,
wherein the hub monitoring system additionally comprises a disturbance situation detector on its own and a tripping device on its own, the disturbance situation detector being configured to identify abnormal operating states autonomously of the central control device and being connected to the tripping device which adjusts the rotor blades to a shut-down position by associated individual pitch device.

18. The wind energy installation of claim 17, wherein a rotor rotation speed transmitter, a rotor position sensor, a longitudinal acceleration sensor, a lateral acceleration sensor, a rotation acceleration sensor, a centrifugal acceleration sensor or a fire alarm is provided as a measurement sensor.

19. A method for operation of a wind energy installation comprising a generator for production of electrical energy, a rotor which drives the generator and has variable pitch rotor blades, and a central control device for controlling the wind energy installation, the pitch angle of the rotor blades being configured to be varied by individual pitch devices which comprise an adjustment drive, a communication link to the central control device and a regulator having a disturbance situation detector and a tripping device, and being configured to be moved to a shut-down position in order to slow down the wind energy installation,
the method comprising:
locally identifying an abnormal operating state by one or more of the individual pitch devices autonomously of the central control device; and
operating the tripping device such that the rotor blades are moved to the shut-down position.

20. The method of claim 19, further comprising:
using one or more of the individual pitch devices to trigger an autonomous selection of an alternative regulator regime from a plurality of available regulator regimes.

21. The method as claimed in claim 20, further comprising:
using one or more of the individual pitch devices to trigger an autonomous determination of a switching point for the selected regulator regime.

22. The method as claimed in claim 20 or 21,
wherein at least one of the plurality of regulator regimes comprises slow-down profiles or parameters of the regulator.

23. The method of claim 20 or 21 wherein at least one of the plurality of regulator regime involves adjusting the rotor blades at a first adjustment rate until a critical blade pitch angle is reached, followed by autonomous selection of a varied regulator regime with a lower, second adjustment rate.

24. The method of claim 19, 20 or 21, further comprising:
operating the adjustment device by an emergency module of the individual pitch device.

25. The method of claim 19, 20 or 21 wherein one or more of the individual pitch devices directly communicate with other individual pitch device via a direct communication link within the rotor.

26. The method of claim 19, 20 or 21
wherein the local identification of the abnormal operating state is carried out such that tripping, a failure or an emergency movement of another individual pitch device is detected.

27. The method of claim 19, 20 or 21
wherein light signals are used for separate signaling of a tripping or failure state.

28. The method of claim 19, 20 or 21, wherein local determination of cyclic adjustment for each rotor blade is used to minimize the mechanical load.

29. The method of claim 28, wherein cyclic adjustment is carried out separately for each of the individual pitch devices.

* * * * *